United States Patent
Layher

(10) Patent No.: US 7,549,288 B1
(45) Date of Patent: Jun. 23, 2009

(54) WAVE ENERGY POWER EXTRACTION SYSTEM

(76) Inventor: Francis W. Layher, c/o Narrows Glen, 8201 - 6th Ave. Room 410, Tacoma, WA (US) 98406

( * ) Notice: Subject to any disclaimer, the term of this patent is extended or adjusted under 35 U.S.C. 154(b) by 0 days.

(21) Appl. No.: 12/252,834

(22) Filed: Oct. 16, 2008

(51) Int. Cl.
*F03B 13/18* (2006.01)
*F03B 13/12* (2006.01)
*F03B 13/10* (2006.01)

(52) U.S. Cl. .............................. 60/497; 60/505; 60/506; 290/42; 290/53

(58) Field of Classification Search ................... 60/497; 290/42, 53
See application file for complete search history.

(56) References Cited

U.S. PATENT DOCUMENTS

| | | | |
|---|---|---|---|
| 1,097,073 A | 5/1914 | Bemis | |
| 1,358,259 A | 11/1920 | Stein | |
| 3,268,154 A | 8/1966 | Aranyi | |
| 3,817,662 A | 6/1974 | Sterk | |
| 4,160,624 A | 7/1979 | Smith | |
| 4,224,527 A | 9/1980 | Thompson | |
| 4,364,715 A | 12/1982 | Bolding | |
| 4,560,884 A | 12/1985 | Whittecar | |
| 4,622,473 A | 11/1986 | Curry | |
| 5,027,000 A | 6/1991 | Chino | |
| 5,179,837 A | 1/1993 | Sieber | |
| 5,473,892 A | 12/1995 | Margittai | |
| 5,708,305 A | 1/1998 | Wolfe | |
| 6,717,284 B2 * | 4/2004 | Lin | 290/53 |
| 6,953,328 B2 | 10/2005 | Welch et al. | |
| 7,059,123 B2 | 6/2006 | Welch et al. | |

FOREIGN PATENT DOCUMENTS

| | | |
|---|---|---|
| DE | 3401273 A1 | 7/1985 |
| GB | 1014196 | 12/1965 |
| GB | 2033488 A | 5/1980 |
| WO | 2006058421 A1 | 6/2006 |

OTHER PUBLICATIONS

Scientific American, Sea Waves Energy: From Research to Reality; Jun. 2007, (1 page).
Ocean Engineering, Technical Note, A Note On The Hydrodynamics of a Tail Tube Buoy, Department of Mechanical Engineering, Indiana Institute of Technology, Accepted Jul. 9, 1999, Korde, Umesh, A., 1473-1484.
Near Shore Floating Oscillating Wave Column, Prototype Development, UK Government www.dti.gov.uk/files/file17347.pdf , Issue Date; unknown, Post 2002.

* cited by examiner

*Primary Examiner*—Thomas E Denion
*Assistant Examiner*—Christopher Jetton
(74) *Attorney, Agent, or Firm*—R. Reams Goodloe, Jr.

(57) ABSTRACT

An apparatus for generating power from waves. Weighted power cells are suspended at opposing ends of a connecting arm supported by a floating frame that rocks in response to passing waves. The power cells compress air or draw a vacuum as they fall and rise, respectively, with respect to passing waves. The compressed air and vacuum are communicated to a pressure chamber and a vacuum chamber, each of which are operably connected to pneumatically drive an electrical generator.

21 Claims, 7 Drawing Sheets

US 7,549,288 B1

WAVE ENERGY POWER EXTRACTION SYSTEM

COPYRIGHT NOTICE

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to extraction of energy waves in oceans or other bodies of water, and more particularly to the generation of power via such energy extraction techniques.

BACKGROUND

Various wave power absorption systems have been proposed or used for conversion of water wave energy to usable power, including electrical power. However, available versions known to me are not configured in a simple, easily adaptable manner that takes advantage of the natural motion of the wave in order to amplify the power stroke of the extraction devices, and thus, maximize power output.

Various systems have adopted certain technological features. However, in such prior art devices known to me, there are significant drawbacks with respect to the ability to capture ocean wave energy and convert it to electrical energy. It has been determined by the United States Department of Energy that wave energy can be forecasted for days ahead of the impact of waves to the shoreline. The further waves travel, and the higher the wind velocity over that area of travel, the larger the size of the wave, and the resultant energy, produced by the wave. The use of satellite data, including photographs, has shown that ocean waves may occur in fairly uniform height and spacing. Such wave patterns are, in a sense, like a battery that has stored energy therein.

For purposes of initial design and calculation, engineers can use a wave size of one (1) meter in height, and a wave frequency of five (5) waves per minute, as a base case ocean wave pattern. From a basic wave parameters, the available energy can be determined by the size and number of energy generation devices deployed. However, from an energy generation density standpoint, it would be advantageous to utilize all, or almost all, of the height of each available wave, in order to maximize the energy extracted. Since many prior art systems do not address this basic principle, there remains a significant and as yet unmet need for a simple electrical power generation system that can easily and efficiently extract energy from ocean waves.

SUMMARY

I have now developed an apparatus for compressing air and pulling a vacuum on storage tanks, via extraction of energy from ocean waves. The device can be adjusted to maximize the energy extracted from a given wave height, and in an embodiment, amplifies the effect of wave height, therein maximizing extraction of energy from the available waves. The device extracts energy from wave motion in water, and particularly from ocean waves, using a tubular power cell having a closed upper end during a compression cycle for compression of ambient air during passage of a wave crest, and using the tubular power cell having a closed upper end during a vacuum cycle for drawing a vacuum using gravity to pull water downward from the power cell, during passage of a wave trough. In an embodiment, the compressed air cycle can be exclusively utilized, without generation of a vacuum in the apparatus.

The device includes a frame that is placed in a desired location and orientation for receiving wave action and rocking in response thereto. The frame may be moored, tethered, or otherwise secured in the desired location. A vacuum chamber and a pressure chamber are provided on the frame. In an embodiment, either or both of the vacuum chamber and the pressure chamber may be provided by dual purpose float portions, i.e., wherein a float portion provides the pressure chamber, and wherein a float portion provides the vacuum chamber. In any event, a first float portion is secured to said frame, and a second float portion is secured to the frame. The first and second float portions are adapted to rest in the body of water, such as the ocean, in order to buoyantly support the device.

At least one connecting arm is provided, and each of the at least one connecting arms includes a first attachment end and a second attachment end. A pair of power cells are attached to and suspended from each of the at least one connecting arms, a first power cell to the first attachment end, and a second power cell to the second attachment end. In an embodiment, the first and second power cells may be provided as vertically elongated tubular members with an open bottom and a closed top. Each of the power cells are weighted to provide negative buoyancy in the body of water, so that the said first and second power cells in each pair of power cells can be downwardly submerged in the water to create compression of air in the first or second power cell, and upwardly withdrawn from the water to create vacuum, with respect to the ambient air, in the first or second power cell, as applicable during the rocking cycle of the device.

Each one of the pair of power cells further includes a pneumatic exhaust valve and a pneumatic inlet valve. The pneumatic exhaust valve has a closed position and an open position. The pneumatic inlet valve has an open position and a closed position. The pneumatic exhaust valve and the pneumatic inlet valve are each operable in a substantially one way configuration. A first pneumatic passageway provides fluid communication between the pressure chamber and each one of the pair of power cells. A second pneumatic passageway provides fluid communication between the vacuum chamber and each one of the pair of power cells. The pneumatic exhaust valves are configured for directing air from the first one or the second one of the pair of power cells, toward the pressure chamber, during compression operation of the respective power cell. The pneumatic inlet valves are configured for directing air from the vacuum chamber toward the first one or toward the second one of the pair of power cells, during vacuum operation.

The connecting arm is adjustably extensible in order to increase or decrease the vertical distance traveled by the power cells in response to rocking motion of the device. Thus, by extending the connecting arm outward to suspend the power cells from an outermost position, relative to the first and second float portions, the power cells rise and fall further during rocking motion, in response to wave action, than when the power cells are located at an inwardmost position, relative to the first and second float portions.

In an embodiment, the vacuum chamber and the pressure chamber may be pneumatically coupled with an electrical generator, for generating electrical power. In an embodiment especially useful for small scale applications, linear action air cylinders may create reciprocating linear motion via application of pressure and/or vacuum, with or without spring action, as applicable, which motion may be translated into circular motion, or articulating linkage, or other connection, for driving an electrical generator.

The foregoing briefly describes an exemplary electrical generation system for generation of electrical energy from ocean waves via compressing air and/or generating a vacuum, and various elements or components thereof. The various objectives, features and advantages of the invention(s) will be more readily understood upon consideration of the detailed description, taken in conjunction with careful examination of the accompanying figures of the drawing.

BRIEF DESCRIPTION OF DRAWING

In order to enable the reader to attain a more complete appreciation of the invention, and of the novel features and advantages thereof, attention is directed to the following detailed description when considered in connection with the accompanying drawings, wherein:

FIG. 6 shows a wave energy extraction device anchored to a single anchor, with one of the power cells completely submerged, ready to begin a vacuum power cycle, and with the other one of the power cells completely above the water level, so that the vacuum cycle has been completed and the connecting arm is ready to start its downward travel, so that once the power cell now out of the water reaches the surface of the water, that power cell can begin its compression cycle.

FIG. 7 shows the wave energy extraction device just depicted in FIG. 6 above, but now with one power cells completely submerged, completing the compression cycle, and the other power cell being pulled from the water, just before it completes a vacuum power cycle.

FIG. 8 shows the wave energy extraction device just depicted in FIGS. 6 and 7, now showing one of the power cells completely above the water, having just completed a vacuum power cycle, and with the other one of the power cells completely below the water level, so that the compression cycle has just being completed.

FIG. 9 shows the wave energy extraction device first depicted in FIGS. 7, 8, and 9, with one of the power cells completely submerged, ready to begin a vacuum power cycle, and with the other one of the power cells completely above the water level, so that the vacuum cycle has been completed and the connecting arm is ready to start its downward travel, so that once the power cell now out of the water reaches the surface of the water, that power cell can begin its compression cycle.

FIG. 10 illustrates an embodiment of a wave energy extraction device at the start of a compression cycle on the right power cell and the start of a vacuum cycle on the left power cell.

FIG. 11 illustrates the embodiment of a wave energy extraction device just shown in FIG. 10, but now showing the relative position of each power cell during a mid point in the compression cycle on the right power cell and the vacuum cycle on the left power cell.

FIG. 12 illustrates the embodiment of a wave energy extraction device shown in FIGS. 10 and 11, but now showing the relative position of each power cell toward the end (but not yet at the end) of the compression cycle (which in an embodiment may occur when the top of the power cell is immersed in the water) on the right power cell and the vacuum cycle on the left power cell; in this embodiment, the left power cell would lift above the surface of the water at the end of the vacuum cycle.

Figure 1:
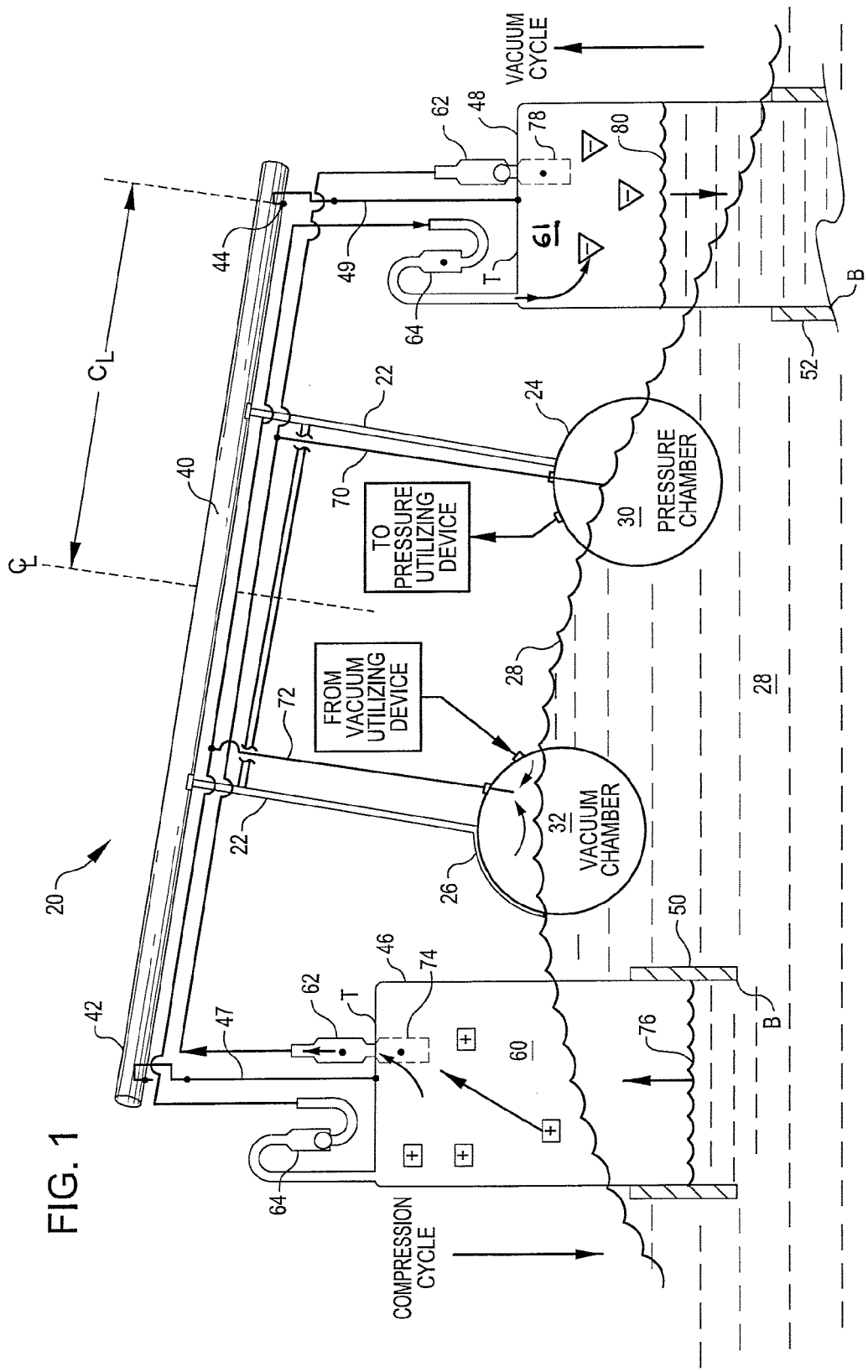
FIG. 1 provides a schematic view of an embodiment for an ocean wave generation system, showing one power cell on a compression cycle, and one power cell on a vacuum cycle, while each of the pair of power cells are suspended from a connecting arm mounted on a frame, which is supported on water by first and second float portions, which, in this embodiment, also serve as pressure chambers and vacuum chambers.

In the various figures of the drawing, like features may be illustrated with the same reference numerals, without further mention thereof. Further, the foregoing figures are merely exemplary, and may contain various elements that might be present or omitted from actual implementations of various embodiments depending upon the circumstances. An attempt has been made to draw the figures in a way that illustrates at least those elements that are significant for an understanding of the various embodiments and aspects of the invention.

However, various other elements of an apparatus for extracting energy from ocean waves, especially as applied for different variations of the functional components illustrated, as well as different embodiments of artistic elements such as a shape of components or visual design of various elements, may be utilized in order to provide a useful, adjustable, and reliable system for extracting power from ocean waves, and where suitable, to generate electrical energy therefrom.

DETAILED DESCRIPTION

Figure 13:
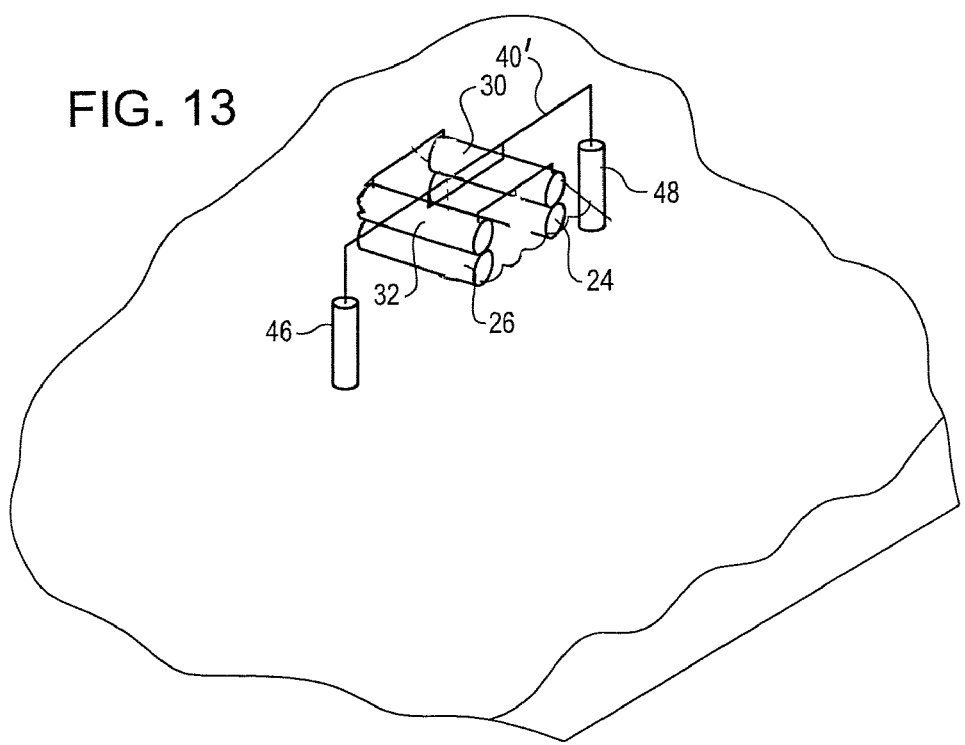
FIG. 13 illustrates yet another embodiment of a wave energy extraction system, here using separate first and second float portions, for flotation only, and a pressure chamber and a vacuum chamber for pressure and vacuum, only, as well as the use of a four anchor system with multiple securing lines to position the wave energy generation system at a desired location.
Figure 14:
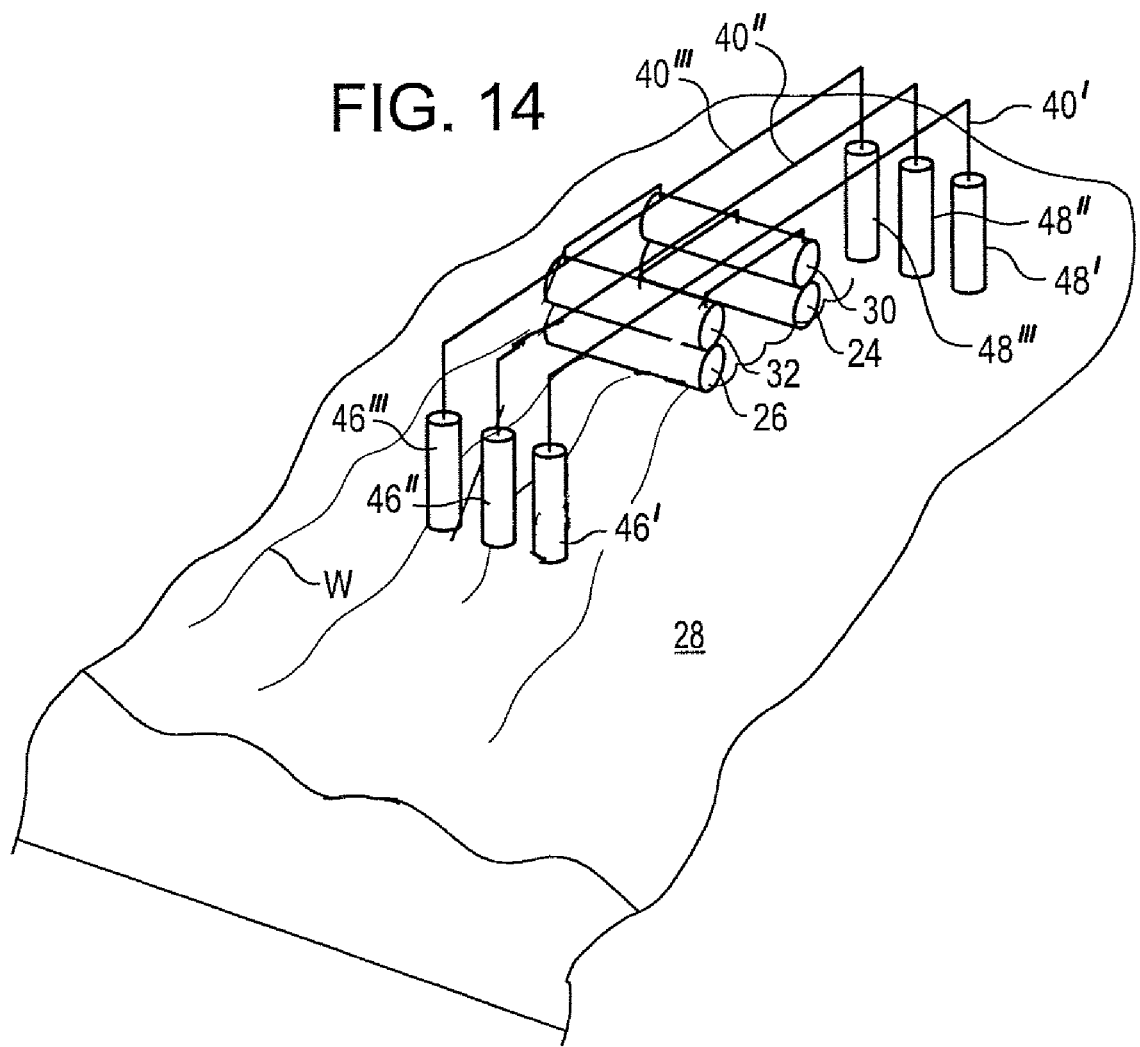
FIG. 14 illustrates yet another embodiment of a wave energy extraction system, here also using separate first and second float portions, for flotation only, and a pressure chamber and a vacuum chamber for pressure and vacuum, only, as well as the use of a single anchor system with multiple securing lines to position the wave energy extraction system at a desired location, as well as a plurality of connecting arms, with each of the connecting arms having a pair of power cells suspended therefrom in a working position relative to the surface of the water having wave motion therein.

Attention is directed to FIG. 1 of the drawing, wherein certain key features of an embodiment for an ocean wave energy extraction apparatus 20 are shown. The apparatus 20 is adapted for the extraction of energy from wave motion through water, and in particularly through ocean water, by use of ambient air. The ocean wave energy extraction apparatus 20 includes a frame 22, a first float portion 24 secured to the frame 22, and a second float portion 26 secured to the frame 22. The first float portion 24 and the second float portion 26 are adapted by displacement, size, and shape, to rest in water 28 to buoyantly support the apparatus 20. As will be further described herein below, in an embodiment, the first float portion 24 may also utilized as a pressure chamber 30. Also as will be further described herein below, in an embodiment, the second float portion 26 may also be utilized as a vacuum chamber 32. However, as also explained herein below, in an embodiment, the first float portion 24 may be provided separate from pressure chamber 30. Likewise, in an embodiment (as shown in FIGS. 13 and 14) the second float portion 26 may be provided separate from vacuum chamber 32. Each of the first float portions 24 or second float portions 26 may be made up of a plurality of tanks, e.g., two or three tanks on the pressure cycle and two or three tanks on the vacuum cycle. And, in an alternate embodiment, the first float portions 24 and the second float portions 26 each may be used entirely for compressed air tanks or entirely for vacuum tanks. Thus, when running in a "compressed air only" cycle a vacuum valve opens the power cell to ambient air, allowing air to enter the cell, so that the apparatus does not have to lift water that is in the power cell.

Returning to FIG. 1, a first connecting arm 40 is provided, and in an embodiment, is securely mounted to frame 22. As can be better seen in FIGS. 2, 3, and 4, a first connecting arm 40' may be mounted transversely with respect to first float portion 24. Also, first connecting arm 40' may be mounted transversely with respect to second float portion 26, so that in each case, the rocking motion of the first connecting arm 40' in response to wave action of the ocean is maximized.

Figure 2:
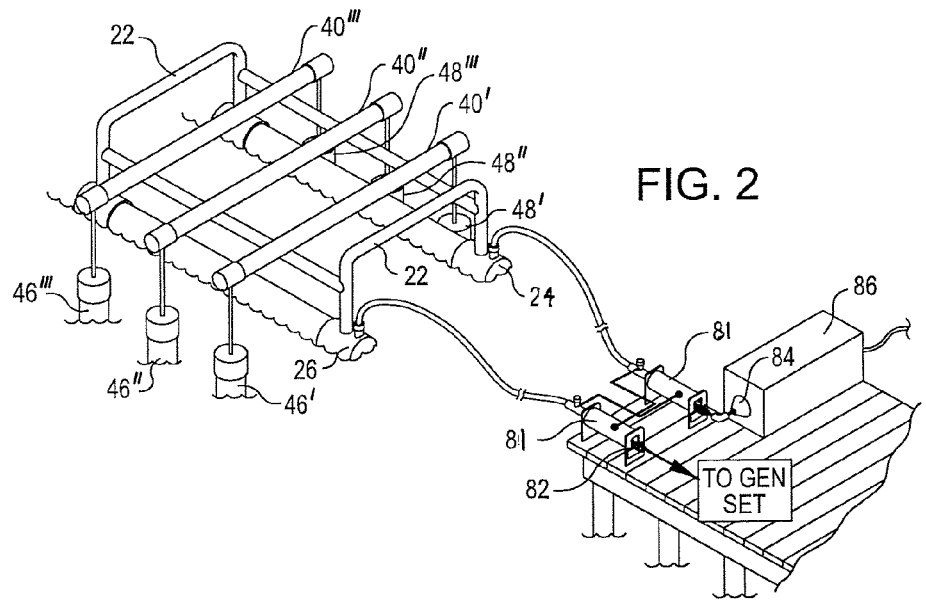
FIG. 2 is a perspective view, showing a wave energy extraction device such as that taught in FIG. 1, however now utilizing three connecting arms and three pairs of power cells, additionally showing the use of pressure and vacuum lines to provide pneumatic connections to energy extraction devices such as linear action air cylinders or turbines mounted on an adjacent facility, such as the shore, or a barge, ship, or platform, to which the wave energy extraction device might be tethered, and in such matter an electrical generator set may be operably connected to the air cylinder output via suitable linkage.
Figure 3:
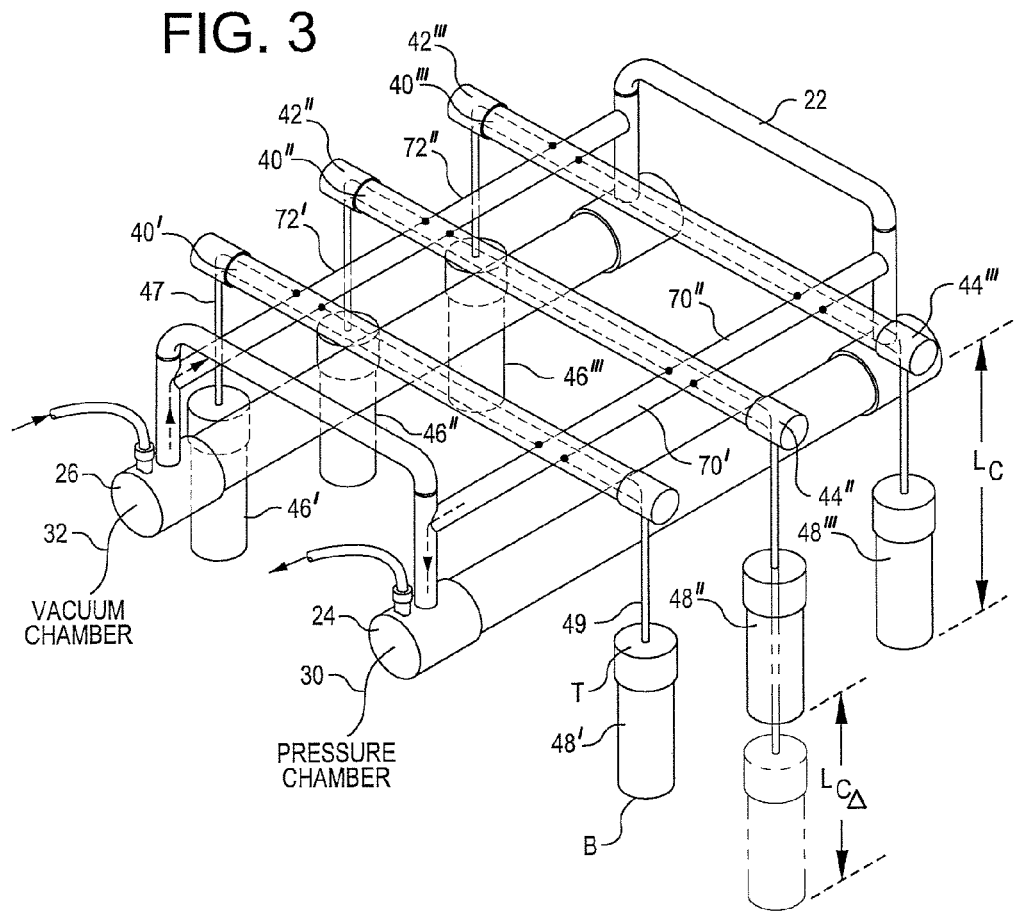
FIG. 3 is perspective view, showing a wave energy extraction device such as that taught in FIG. 1, showing three connecting arms and three power cells, while also showing the possible vertical adjustment of the position of a power cell, relative to the connecting arm to which it is attached.
Figure 4:
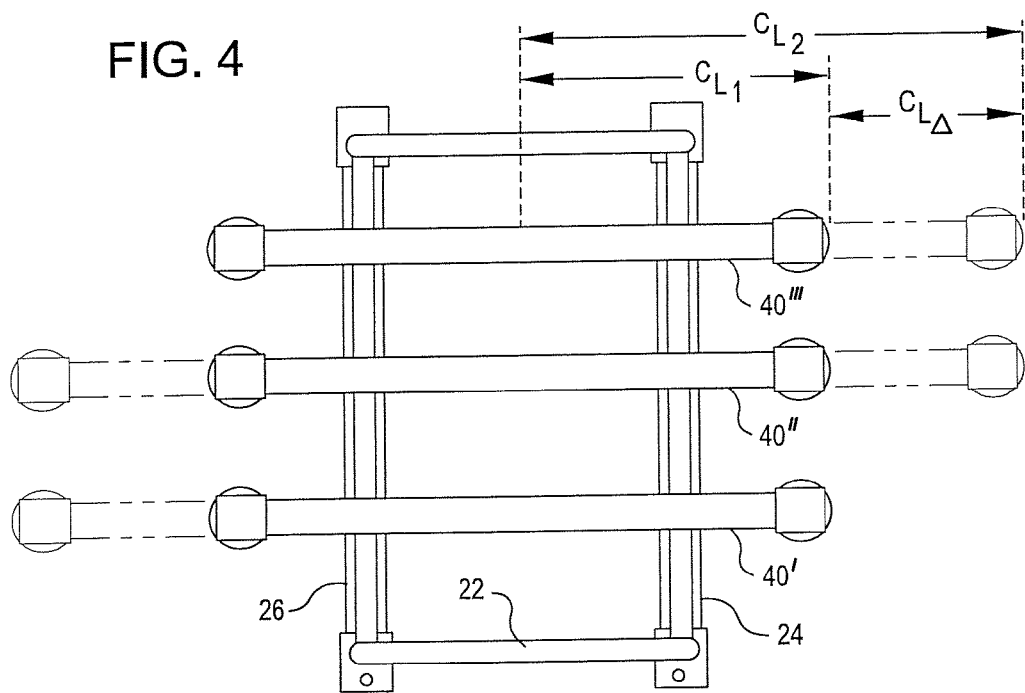
FIG. 4 is a top plan view, showing a wave energy extraction device such as that just illustrated in FIG. 3, and further illustrating the possible horizontal extension of the position of a power cell, along the connecting arm to which it is attached.
Figure 5:
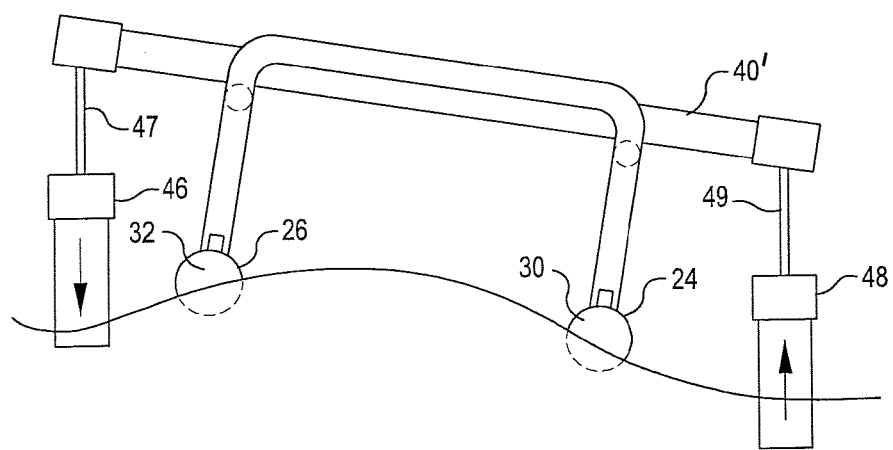
FIG. 5 is a simplified side view, similar to the embodiment illustrated in FIG. 1 above, but now showing that the various pneumatic passageways may, in an embodiment, be concealed by running the same within a connecting arm, as also indicated in FIG. 3 above.

As mentioned herein above and further described herein below, connecting arm 40' of FIGS. 2, 3, and 4 may be distinguished from connecting arm 40 of FIG. 1 in that simply for clarity of operational description, in FIG. 1, various pneumatic lines are shown mounted external to connecting arm 40, whereas in practice, either internal or external mounting of pneumatic lines may be utilized as may be cost effective for a given construction method selected. The first connecting arm 40 (also, first connecting arm 40') has a first attachment end 42 and a second attachment end 44. A first power cell 46, in an embodiment provided in the shape of a vertically elongated tubular member with an open bottom and closed top, is suspended, in an embodiment via cable 47, from the first connecting arm 40 at the first attachment end 42. A second power cell 48, in an embodiment provided in the shape of a vertically elongated tubular member with an open bottom B and closed top T, is in an embodiment suspended via cable 49, from the first connecting arm 40 at the second attachment end 44. The first power cell 46 and the second power cell 48 (and similar power cells in each pair of power cells suspended from a connecting arm 40, 40', 40", 40''' etc.) are each weighted, such as by way of weights 50 and 52, which in an embodiment may be tubular in shape to match the tubular shape of the first 46 and second 48 power cells. The power cells 46 and 48 are provided with negative buoyancy in the water 28, so that the first 46 and second 48 power cells can be downwardly submerged in the water 28 to create compression of air 60 in the first 46 or second 48 power cell, and upwardly withdrawn from water 28 to create vacuum in space 61, with respect to said ambient air, in the first 46 or second 48 power cell.

For operation, the first power cell 46 and the second power cell 48 each further include a pneumatic exhaust valve 62 and a pneumatic inlet valve 64. The pneumatic exhaust valve 62 has a closed position and an open position, and in the open position, as shown at first power cell 46 in FIG. 1, pressurized air 60 is allowed to escape first power cell 46 through pneumatic exhaust valve 62. However, when a power cell (either 46 or 48 or the like) is in a vacuum cycle, as shown with second power cell 48 in FIG. 1, the pneumatic exhaust valve 62 returns to a closed position, to prevent blowback of pressurized air into the power cell 48. Thus, the pneumatic exhaust valve 62 is provided operable in a substantially one-way configuration, wherein the pneumatic exhaust valves 62 are configured for directing air from the first 46 or said second 48 power cells toward the pressure chamber 30 during compression operation of each of first 46 or second 48 power cells.

The pneumatic inlet valve 64 also has an open position (shown with respect to second power cell 48 in FIG. 1) and a closed position (shown with respect to first power cell 46 in FIG. 1). The pneumatic inlet valve 64 is operable in a substantially one way configuration, so that it is closed during pressure cycle operation as shown with respect to first power cell 46 in FIG. 1. Thus, the pneumatic inlet valves 64 are configured for directing air from the vacuum chamber 32 toward the first 46 or second 48 power cells, during vacuum operation of each of first 46 or second 48 power cells.

A first pneumatic passageway 70 provides fluid communication between the pressure chamber 30 and each of first 46 and second 48 power cells. A second pneumatic passageway 72 provides fluid communication between the vacuum chamber 32 and each of the first 46 (or 46', 46" and 46''') and second 48 (or 48', 48", and 48''') power cells.

As seen in FIG. 1, the first power cell 46 also includes a float valve 74, which is provided upstream of the pneumatic exhaust valve 62 and which is operable to substantially prevent water 76 from leaving the first power cell 46 through the pneumatic exhaust valve 62. As also seen in FIG. 1, the second power cell 48 includes a second float valve 78, which is provided upstream of the pneumatic exhaust valve 62, and which is operable to substantially prevent water 80 from leaving the second power cell 48 through the pneumatic exhaust valve 62.

As briefly described above, a second connecting arm 40" may be provided mounted substantially parallel to the first connecting arm 40'. In an embodiment, the second connecting arm 40" has a third attachment end 42" and a fourth attachment end 44". A third power cell 46" and a fourth power cell 48" are provided. The third power cell 46" and a fourth power cell 48" are suspended from the second connecting arm 40" at the third attachment end 42" and at the fourth attachment end 44", respectively. Each of the third power cell 46" and fourth power cell 48" may, in an embodiment, be provided as a vertically elongated tubular member with an open bottom B and closed top T.

Similarly, a third connecting arm 40''' may be provided mounted substantially parallel to the first connecting arm 40' and to second connecting arm 40". In an embodiment, the third connecting arm 40''' has a fifth attachment end 42''' and a sixth attachment end 44'''. A fifth power cell 46''' and a sixth power cell 48''' are provided. The fifth power cell 46''' and a sixth power cell 48''' are suspended from the third connecting arm 40''' at the fifth attachment end 42''' and at the sixth attachment end 44''', respectively. Each of the third power cell 46" and fourth power cell 48" may, in an embodiment, be provided as a vertically elongated tubular member with an open bottom and closed top.

Like first 46 and second 48 power cells, the third 46' and fourth 48' power cells, as well as the fifth 46''' and sixth 48''' power cells each are weighted to have negative buoyancy in water 28. That way, any of the power cells can be downwardly submerged in the water 28 to create compression, or upwardly withdrawn from water 28 to create vacuum, in a respective power cell.

Each of the additional power cells are, in an embodiment, normally provided with a pneumatic exhaust valve 62 and a pneumatic inlet valve 64, operable in the fashion described with respect to the embodiments illustrated in FIG. 1. A third pneumatic passageway 70' provides fluid communication between the pressure chamber 30 and each of third 46" and fourth 48" power cells. A fourth pneumatic passageway 72' provides fluid communication between the vacuum chamber 32 and each of third 46" and fourth 46" power cells. A fifth pneumatic passageway 70" provides fluid communication between the pressure chamber 30 and each of the fifth 46''' and sixth 48''' power cells. A sixth pneumatic passageway 72''' provides fluid communication between the vacuum chamber 26 and each of the fifth 46''' and sixth 48''' power cells. Operation of the third 46", fourth 48", fifth 46''', and sixth 48''' power cells is generally as described with respect to FIG. 1 for power cells 46 and 48, during their respective compression cycle and vacuum cycle operations.

The wave motion energy generation apparatus 20 as described herein relies on the motion of waves W in water 28 to rock the apparatus 20. As seen in various figures of the drawing, in operation, pairs of power cells suspended from the first 40', or second 40", or said third 40" connecting arms, are alternately withdrawn from or immersed into the water W, so that within one of the power cells in the pair, a vacuum is drawn, while within another one of the power cells in the pair, pressure is created. While in various embodiments, power cells are shown as being substantially cylindrical in shape, it is to be understood that this is for convenience and except where otherwise claimed shall be in no way considered to limit the shape of the power cells to such a configuration.

Figure 6:
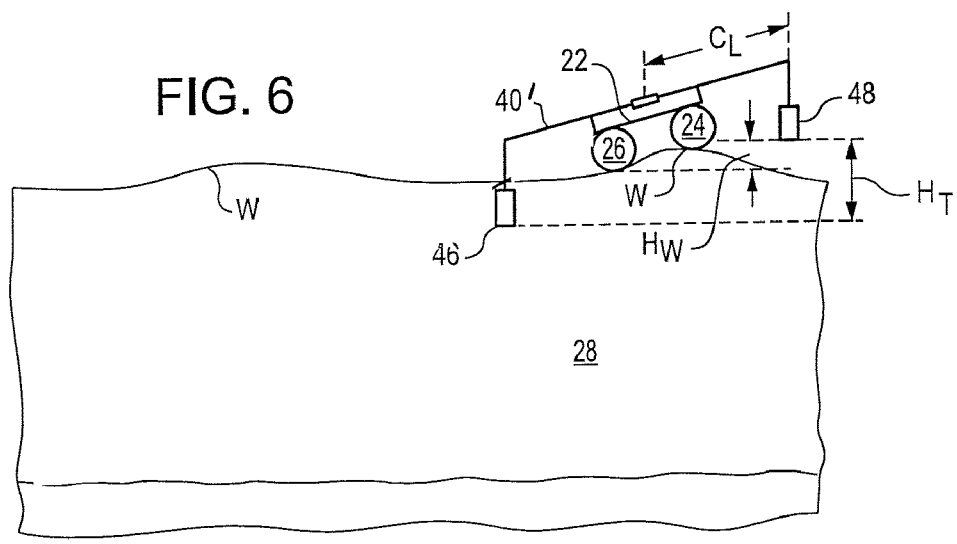
FIGS. 6, 7, 8, and 9 show the method of operation of an embodiment of the wave energy extraction device.
Figure 7:
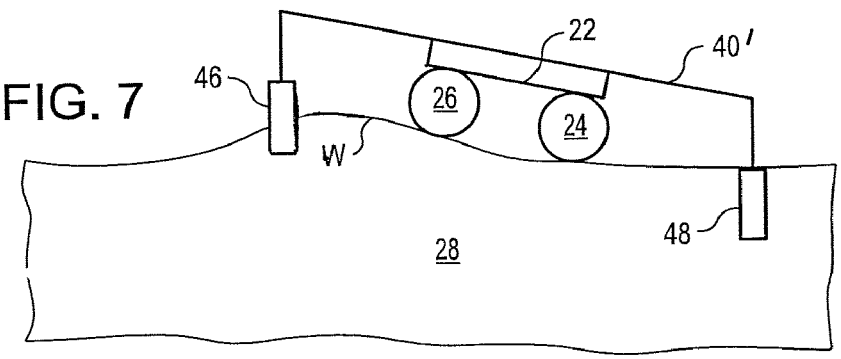
Figure 8:
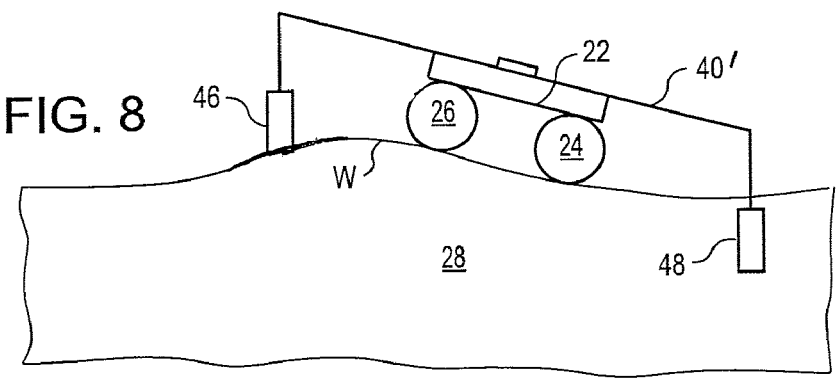
Figure 9:
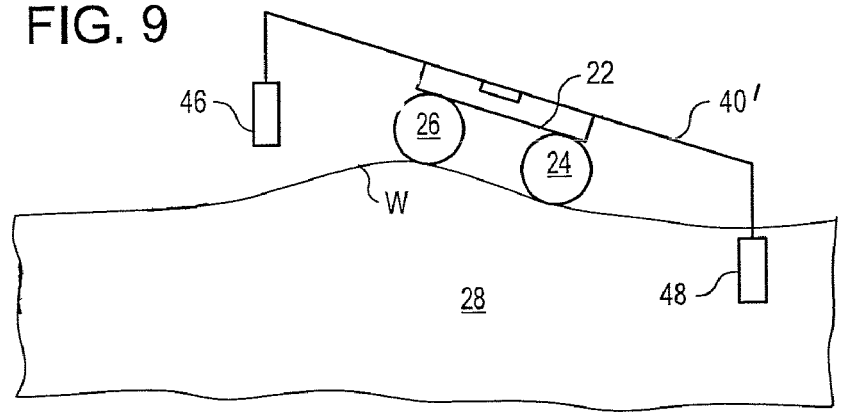
Figure 10:
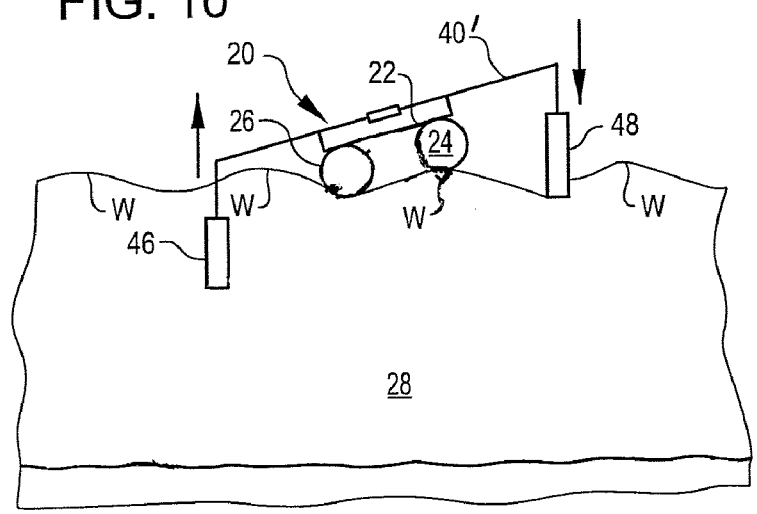
FIGS. 10, 11, and 12 provide a schematic view of yet another embodiment of a wave energy extraction device, now showing the device in various locations during a cycle of compression and vacuum formation.
Figure 11:
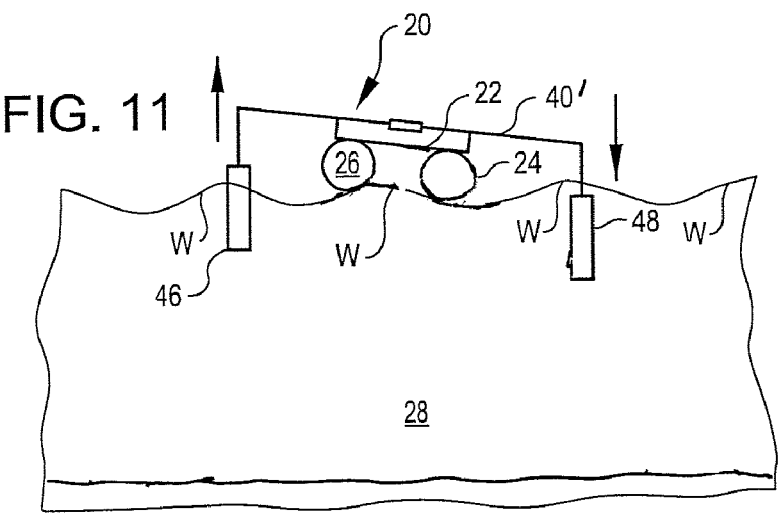
Figure 12:
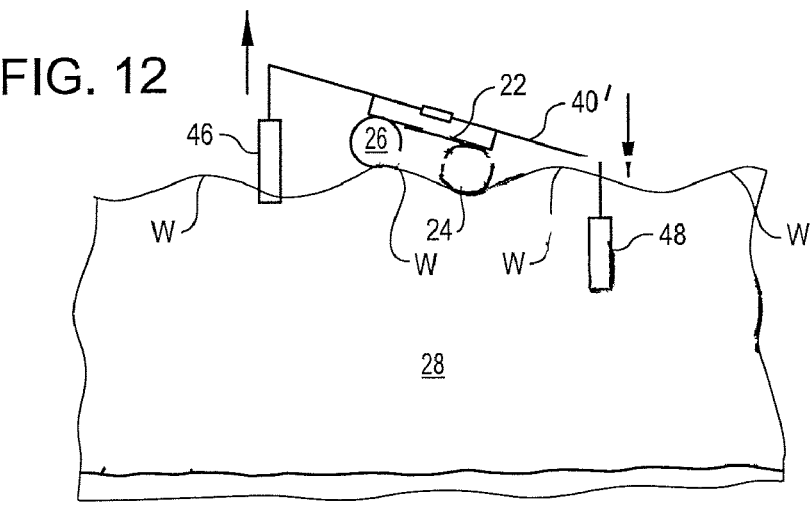

In an embodiment, power cells may be suspended from their respective connecting arm in a manner and with suitable support materials such that the power cells freely maintain a vertical orientation when a respective connecting arm, such as 40', 40", or 40''' moves in response to wave motion in the water. Further, as is illustrated in FIG. 6, in an embodiment, it may be advantageous to provide a design wherein the connecting arms 40, 40', 40", or 40''', etc., have a length ($C_L$) sufficiently long (measured center to support points at first attachment end 42 or second attachment end 44), so that said when the apparatus 20 rocks in response to wave motion in the water, the vertical travel ($H_T$) of the respective power cells exceeds the height ($H_W$) of wave motion in the water. Further, as shown in the embodiment illustrated in FIG. 4, it may be advantageous to provide connecting arms of adjustable length, wherein the length ($C_L$) of said connecting arms is adjustably extensible by a length ($C_{LA}$). Further, as shown in the embodiment illustrated in FIG. 3, each of the power cells may be suspended from a respective connecting arm by a length ($L_C$), wherein the length ($L_C$), is adjustably extensible by a length ($L_{CA}$).

For generation of power, various alternatives are available for utilization of pressure and vacuum created by the apparatus 20 already described herein. For example, in the embodiment shown in FIG. 2, a double acting air cylinder 81 may be fluidly connected to the vacuum chamber 32 and to the pressure chamber 30, in a manner wherein the double acting air cylinder utilizing, by pneumatic action, using vacuum force from the vacuum chamber and pressure force from the pressure chamber, reciprocally energizes a linear rod 82 thereby providing work. Further, a mechanical linkage 84 for converting linear reciprocating motion of the linear rod 82 into rotary motion may be provided. An electrical generator 86 can be driven via the rotary motion from the mechanical linkage 84 drive. In any event, an electrical generator 86 can be provided, wherein the electric power generator 86 is pneumatically powered using pressurized air from the pressure chamber 30. Alternately, or in addition to use of pressurized air, an electrical generator 86 can be further pneumatically powered using the vacuum chamber 32 as a vacuum source for motive power.

Finally, the wave energy apparatus 20 may also include a suitable directional tethering or mooring system. Such a system may include one or more connectors (not shown) such as rope or cable. The one or more connectors may be adapted to secure the apparatus 20 in the water along a selected wave receiving orientation. Further, the connectors may additionally include tensioning devices, such as underwater buoys (not shown), that maintain the orientation of apparatus 20 during tidal cycles of ocean waters. In yet another embodiment, a wave energy apparatus 20 may be moored in tandem with other similar wave energy apparatus devices 20, oriented downwind from a barge or other floating power generating apparatus. Consequently, it can be appreciated that multiple wave energy extraction apparatus devices 20 may be tethered one behind the other, extending from an upwind platform or ship, for example, on which an electrical generating plant may be located. In an embodiment, such barge or ship may contain a plurality of storage batteries, which, in turn, may be taken to shore, where the stored energy is utilized in a suitable energy grid.

In summary, in various embodiments, the device described herein utilizes weighted power cells that are suspended at opposing ends of a connecting arm, supported by a floating frame that rocks in response to passing waves. The power cells compress air or draw a vacuum as they fall and rise, respectively, with respect to passing waves. The compressed air and vacuum are communicated to a pressure chamber and a vacuum chamber, each of which are operably connected to an energy extraction device, such as a pneumatically driven electrical generator.

It is to be appreciated that the various aspects, features, structures, and embodiments of an electrical power generation system for extracting power from ocean waves as described herein is a significant improvement in the state of the art. The apparatus described is simple, reliable, and easy to use. Although only a few exemplary aspects and embodiments have been described in detail, various details are sufficiently set forth in the drawing figures and in the specification provided herein to enable one of ordinary skill in the art to make and use the invention(s), which need not be further described by additional writing.

Importantly, the aspects, features, structures, and embodiments described and claimed herein may be modified from those shown without materially departing from the novel teachings and advantages provided, and may be embodied in other specific forms without departing from the spirit or essential characteristics thereof. Therefore, the various aspects and embodiments presented herein are to be considered in all respects as illustrative and not restrictive. As such, this disclosure is intended to cover the structures described herein and not only structural equivalents thereof, but also equivalent structures. Numerous modifications and variations are possible in light of the above teachings. The scope of the invention, as described herein is thus intended to include variations from the various aspects and embodiments provided which are nevertheless described by the broad meaning and range properly afforded to the language herein, as explained by and in light of the terms included herein, or the legal equivalents thereof.

The invention claimed is:

1. An apparatus for extraction of energy from wave motion in water, using air, comprising:
    a frame, a vacuum chamber, and a pressure chamber;
    a first float portion secured to said frame, said first float portion adapted to rest in said water to buoyantly support said apparatus;
    a second float portion secured to said frame, said second float portion adapted to rest in said water to buoyantly support said apparatus;
    a first connecting arm, said first connecting arm mounted to said frame, said first connecting arm having a first attachment end and a second attachment end;
    a first power cell and a second power cell,
        said first power cell and said second power cells each comprising a vertically elongated tubular member with an open bottom and closed top,
        said first power cell and said second power cell suspended from said first connecting arm at said first attachment end and at said second attachment end, respectively,
        said first power cell and said second power cell each weighted to have negative buoyancy in said water, so that said first and second power cells can be downwardly submerged in said water to create compression of air in said first or said second power cell, and upwardly withdrawn from said water to create vacuum, with respect to said ambient air, in said first or said second power cell;
        said first power cell and said second power cell each further comprising a pneumatic exhaust valve and a pneumatic inlet valve, said pneumatic exhaust valve having a closed position and an open position, and said pneumatic inlet valve having an open position and a closed position, said pneumatic exhaust valve and said pneumatic inlet valve each operable in a substantially one way configuration; and
    a first pneumatic passageway providing fluid communication between said pressure chamber and each of said first and said second power cells, and
    a second pneumatic passageway providing fluid communication between said vacuum chamber and each of said first and said second power cells; and wherein
    said pneumatic exhaust valves are configured for directing air from said first or said second power cells toward said pressure chamber, during compression operation, and wherein said pneumatic inlet valves are configured for directing air from said vacuum chamber toward said first or said second power cells, during vacuum operation.

2. The apparatus as set forth in claim 1, wherein said first power cell further comprises a float valve, said float valve provided upstream of said pneumatic exhaust valve and operable to substantially prevent water from leaving said first power cell through said pneumatic exhaust valve of said first power cell.

3. The apparatus as set forth in claim 1, wherein said second power cell further comprises a second float valve, said second float valve provided upstream of said pneumatic exhaust valve in said second power cell, and operable to substantially prevent water from leaving said second power cell through said pneumatic exhaust valve of said second power cell.

4. The apparatus as set forth in claim 1, wherein said first float portion comprises said pressure chamber.

5. The apparatus as set forth in claim 1 or in claim 4, wherein said second float portion comprises said vacuum chamber.

6. The apparatus as set forth in claim 1, wherein said first connecting arm is mounted substantially transversely with respect to first float portion.

7. The apparatus as set forth in claim 1, wherein said first connecting arm is mounted substantially transversely with respect to second float portion.

8. The apparatus as set forth in claim 1, further comprising
    a second connecting arm, said second connecting arm mounted substantially parallel to said first connecting arm, said second connecting arm having a third attachment end and a fourth attachment end;
    a third power cell and a fourth power cell,
        said third power cell and said fourth power cell each comprising a vertically elongated tubular member with an open bottom and closed top,
        said third power cell and said fourth power cell suspended from said second connecting arm at said third attachment end and at said fourth attachment end, respectively,
        said third power cell and said fourth power cell each weighted to have negative buoyancy in said water, so that said third and fourth power cells can be downwardly submerged in said water to create compression in said third or said fourth power cell, and upwardly withdrawn from said water to create vacuum in said third or said fourth power cell;
        said third power cell and said fourth power cell each further comprising a pneumatic exhaust valve and a pneumatic inlet valve, said pneumatic exhaust valve having a closed position and an open position, and said pneumatic inlet valve having an open position and a closed position, said pneumatic exhaust valve and said pneumatic inlet valve each operable in a substantially one way configuration; and
    a third pneumatic passageway providing fluid communication between said pressure chamber and each of said third and fourth power cells, and
    a fourth pneumatic passageway providing fluid communication between said vacuum chamber and each of said third and said fourth power cells; and wherein
    said pneumatic exhaust valves are configured for directing air from said third or said fourth power cells toward said pressure chamber, during compression operation, and wherein said pneumatic inlet valves are configured for directing air from said vacuum chamber toward said third or said fourth power cells, during vacuum operation.

9. The apparatus as set forth in claim 8, further comprising a third connecting arm, said third connecting arm mounted substantially parallel to said first connecting arm, said third connecting arm having a fifth attachment end and a sixth attachment end;

a fifth power cell and a sixth power cell, said fifth power cell and said sixth power cell each comprising a vertically elongated tubular member with an open bottom and closed top, said fifth power cell and said sixth power cell suspended from said second connecting arm at said fifth attachment end and at said sixth attachment end, respectively, said fifth power cell and said sixth power cell each weighted to have negative buoyancy in said water, so that said fifth and sixth power cells can be downwardly submerged in said water to create compression in said fifth or said sixth power cell, and upwardly withdrawn from said water to create vacuum in said fifth or said sixth power cell;

said fifth power cell and said sixth power cell each further comprising a pneumatic exhaust valve and a pneumatic inlet valve, said pneumatic exhaust valve having a closed position and an open position, and said pneumatic inlet valve having an open position and a closed position, said pneumatic exhaust valve and said pneumatic inlet valve each operable in a substantially one way configuration; and a fifth pneumatic passageway providing fluid communication between said pressure chamber and each of said fifth and sixth power cells, and a sixth pneumatic passageway providing fluid communication between said vacuum chamber and each of said fifth and said sixth power cells; and wherein said pneumatic exhaust valves are configured for directing air from said fifth or said sixth power cells toward said pressure chamber, during compression operation, and wherein said pneumatic inlet valves are configured for directing air from said vacuum chamber toward said fifth or said sixth power cells, during vacuum operation.

10. The apparatus as set forth in claim 1, or in claim 8, or in claim 9, wherein wave motion in said water rocks said apparatus, so that in operation, pairs of power cells suspended from said first, or said second, or said third connecting arms, are alternately withdrawn from or immersed into said water, so that within one of said power cells a vacuum is drawn, while within one of said power cells, pressure is created.

11. The apparatus as set forth in any one of claims 1, 8, or 9, wherein one or more of said power cells are substantially cylindrical in shape.

12. The apparatus as set forth in any one of claims 1, 8, or 9, wherein said power cells are each suspended from a respective connecting arm such that said power cells freely maintain a vertical orientation when a respective connecting arm moves in response to wave motion in said water.

13. The apparatus as set forth in any one of claims 1, 8, or 9, wherein said connecting arms have a length (CL) sufficiently long, so that said when said apparatus rocks in response to wave motion in said water, the vertical travel (HT) of said power cells exceeds the height (HW) of wave motion in said water.

14. The apparatus as set forth in claim 13, wherein the length (CL) of said connecting arms is adjustably extensible.

15. The apparatus as set forth in claim 12, wherein each of said power cells is suspended from a respective connecting arm by a length (LC), and wherein said length (LC), is adjustably extensible.

16. The apparatus as set forth in claim 1, further comprising a double acting air cylinder, said double acting air cylinder fluidly connected to said vacuum chamber and to said pressure chamber, said double acting air cylinder utilizing, by pneumatic action, vacuum force from said vacuum chamber and pressure force from said pressure chamber, to reciprocally energize a linear rod, thereby providing work.

17. The apparatus as set forth in claim 16, further comprising mechanical linkage for converting linear reciprocating motion of said linear rod into rotary motion.

18. The apparatus as set forth in claim 17, further comprising an electrical generator, and wherein said rotary motion from said mechanical linkage drives said electrical generator.

19. The apparatus as set forth in any one of claims 1, 8, or 9, further comprising an electrical power generator, wherein said electric power generator is pneumatically powered using pressurized air from said pressure chamber.

20. The apparatus as set forth in claim 19, wherein said electrical power generator is further pneumatically powered using said vacuum chamber as a vacuum source.

21. The apparatus as set forth in any one of claims 1, 8, or 9, further comprising an anchoring system, said anchoring system comprising one or more anchors and one or more connectors, said one or more connectors adapted to secure said apparatus relative to said one or more anchors in said water along a selected wave receiving orientation.

\* \* \* \* \*

UNITED STATES PATENT AND TRADEMARK OFFICE
CERTIFICATE OF CORRECTION

PATENT NO. : 7,549,288 B1  Page 1 of 1
APPLICATION NO. : 12/252834
DATED : June 23, 2009
INVENTOR(S) : Francis W. Layher It is certified that error appears in the above-identified patent and that said Letters Patent is hereby corrected as shown below:

ON THE TITLE PG. ITEM -56-

Under "References Cited, Other Publications", in the document reference of "Ocean Engineering", after the words "Indiana Institute of Technology," insert --received 7 May 1999;--

Column 1, line 45, after the word "From", delete "a".
Column 3, line 67, after the words "with one power", delete "cells" and insert therefor --cell--.
Column 4, line 11, after the word "FIGS.", delete "7, 8, and 9" and insert therefor --6, 7, and 8--.
Column 5, line 16, after the word "and", delete "in".

Column 12, line 11, after the words "so that", delete "said".

Signed and Sealed this

Thirteenth Day of October, 2009

David J. Kappos
*Director of the United States Patent and Trademark Office*